United States Patent
Simoncini et al.

(10) Patent No.: US 12,510,361 B2
(45) Date of Patent: Dec. 30, 2025

(54) SYSTEMS AND METHODS FOR CLASSIFYING A VEHICLE MANEUVER USING A SPATIOTEMPORAL ATTENTION SELECTOR

(71) Applicant: Verizon Patent and Licensing Inc., Basking Ridge, NJ (US)

(72) Inventors: Matteo Simoncini, Pistoia (IT); Tommaso Bianconcini, Florence (IT); Luca Bravi, Sesto Fiorentino (IT); Leonardo Sarti, Florence (IT); Leonardo Taccari, Florence (IT); Douglas Coimbra De Andrade, Florence (IT); Francesco Sambo, Florence (IT)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 306 days.

(21) Appl. No.: 18/464,003

(22) Filed: Sep. 8, 2023

(65) Prior Publication Data
US 2025/0085109 A1    Mar. 13, 2025

(51) Int. Cl.
*G01C 21/16* (2006.01)
*B60W 40/09* (2012.01)
*G01S 19/47* (2010.01)

(52) U.S. Cl.
CPC ......... *G01C 21/1656* (2020.08); *B60W 40/09* (2013.01); *G01S 19/47* (2013.01)

(58) Field of Classification Search
CPC ........... G01C 21/1656; G01C 21/3697; B60W 40/09; G01S 19/47
See application file for complete search history.

(56) References Cited

U.S. PATENT DOCUMENTS

2015/0338430 A1* 11/2015 Gorjestani ............ G01P 15/00
                                                      702/141
2022/0066456 A1* 3/2022 Ebrahimi Afrouzi .................
                                                   G06F 3/04883

OTHER PUBLICATIONS

Taccari, Leonardo et al. "Classification of Crash and Near-Crash Events from Dashcam Videos and Telematics." 2018 21st International Conference on Intelligent Transportation Systems (ITSC). IEEE, 2018. 2460-2465. Web. (Year: 2018).*
Suzuki, Tomoyuki et al. "Anticipating Traffic Accidents with Adaptive Loss and Large-Scale Incident DB." 2018 IEEE/CVF Conference on Computer Vision and Pattern Recognition. IEEE, 2018. 3521-3529. Web. (Year: 2018).*

(Continued)

*Primary Examiner* — John R Wallace

(57) ABSTRACT

A device may receive video data and corresponding GPS data and IMU data associated with a vehicle, and may process the video data, with an object detector model, to identify objects and to generate a first feature vector. The device may process the GPS data and the IMU data, with a first CNN model, to generate a second feature vector, and may process the objects and the video data, with a tracking model, to identify positions and classes of the objects and to generate a third feature vector. The device may utilize a second CNN model to generate a matrix of object features based on the first, second, and third feature vectors, and may utilize a spatiotemporal attention selector model or a max pooled model with the matrix of object features to identify a classification of a maneuver of the vehicle. The device may perform actions based on the classification.

20 Claims, 12 Drawing Sheets

(56) References Cited

OTHER PUBLICATIONS

Simoncini et al., "Two-stream neural architecture for unsafe maneuvers classification from dashcam videos and GPS/IMU sensors," International Conference on Intelligent Transportation Systems, IEEE, 2020, 6 Pages.
World Health Organization et al., "Global status report on road safety 2018: Summary," World Health Organization, Tech. Rep., 2018, 424 Pages.
Hankey et al., "Description of the SHRP 2 naturalistic database and the crash, near-crash, and baseline data sets," Virginia Tech Transportation Institute, Tech. Rep., 2016, 58 Pages.
Bahdanau et al., "Neural machine translation by jointly learning to align and translate," arXiv:1409.0473v7, May 19, 2016 15 Pages.
Vaswani et al., "Attention is all you need," Advances in neural information processing systems, Aug. 2, 2023, 15 Pages.
De Andrade et al., "A neural attention model for speech command recognition," arXiv:1808.08929v1, Aug. 27, 2018, 18 Pages.
Chan et al., "Anticipating accidents in dashcam videos," ACCV, Springer, 2016, 16 Pages.
Suzuki et al., "Anticipating traffic accidents with adaptive loss and large-scale incident db," CVPR, Apr. 8, 2018, 9 Pages.
Xu et al., "Show, attend and tell: Neural image caption generation with visual attention," Proceedings of the 32nd International Conference on Machine Learning, Lille, France, 2015, 10 Pages.
Anderson et al., "Bottom-up and top-down attention for image captioning and visual question answering," CVPR, 2018, 10 Pages.
Herdade et al., "Image captioning: Transforming objects into words," Advances in Neural Information Processing Systems, Jan. 11, 2020, 11 Pages.
Cultrera et al., "Explaining autonomous driving by learning end-to-end visual attention," Proceedings of the IEEE/CVF CVPR Workshops, Feb. 3, 2023, 13 Pages.
Woo et al., "Cbam: Convolutional block attention module," ECCV, 2018, 17 Pages.
Hu et al., "Squeeze-and-excitation networks," CVPR, May 16, 2019, 13 Pages.
Gunning et al., "DARPA's Explainable artificial intelligence program," Defense Advanced Research Projects Agency (DARPA), AI Magazine, 2019, 15 Pages.
Gilpin et al., "Explaining explanations: An overview of interpretability of machine learning," DSAA. IEEE, Feb. 3, 2019, 10 Pages.
Abdul et al., "Trends and trajectories for explainable, accountable and intelligible systems: An hci research agenda," in CHI, 2018, 18 Pages.
Rosenfeld et al., "Explainability in human-agent systems," Autonomous Agents and Multi-Agent Systems, Jun. 26, 2019, 8 Pages.
Yao et al., "Unsupervised traffic accident detection in first-person videos," arXiv:1904.08123v1, Apr. 17, 2019, 26 Pages.
Taccari et al., "Classification of crash and near-crash events from dashcam videos and telematics," in ITSC. IEEE, 2018, 6 Pages.
Yuan et al., "Forward Vehicle Collision Warning Based on Quick Camera Calibration" Neurocomputing, 2020, 5 Pages.
Peng et al., "Driving maneuver detection via sequence learning from vehicle signals and video images," in ICPR, IEEE, 2018, 6 Pages.
Zekany et al., "Classifying egovehicle road maneuvers from dashcam video," in ITSC. IEEE, 2019, 7 Pages.
Deo et al., "How would surround vehicles move? A unified framework for maneuver classification and motion prediction," Transactions on Intelligent Vehicles, Jan. 19, 2018, 12 Pages.
Kim et al., "Textual explanations for self-driving vehicles," ECCV, Jun. 30, 2018, 24 Pages.
Zhou et al., "Places: A 10 million image database for scene recognition," IEEE Transactions on Pattern Analysis and Machine Intelligence, 2017, 14 Pages.
Ren et al., "Faster r-cnn: Towards real-time object detection with region proposal networks," Advances in neural information processing systems, Jan. 6, 2016, 14 Pages.
He et al., "Deep residual learning for image recognition," CVPR, Dec. 10, 2015, 12 Pages.
Girshick, "Fast r-cnn," ICCV, Sep. 27, 2015, 9 Pages.
Chollet, "Xception: Deep learning with depthwise separable convolutions," CVPR, 2017, 8 Pages.
Howard et al., "Mobilenets: Efficient convolutional neural networks for mobile vision applications," arXiv, Apr. 17, 2017, 9 Pages.
Zhang et al., "Hello edge: Keyword spotting on microcontrollers," arXiv preprint arXiv:1711.07128, Feb. 14, 2018, 14 Pages.
Kingma et al., "Adam: A method for stochastic optimization," arXiv preprint arXiv:1412.6980, Jan. 30, 2017, 15 Pages.

\* cited by examiner

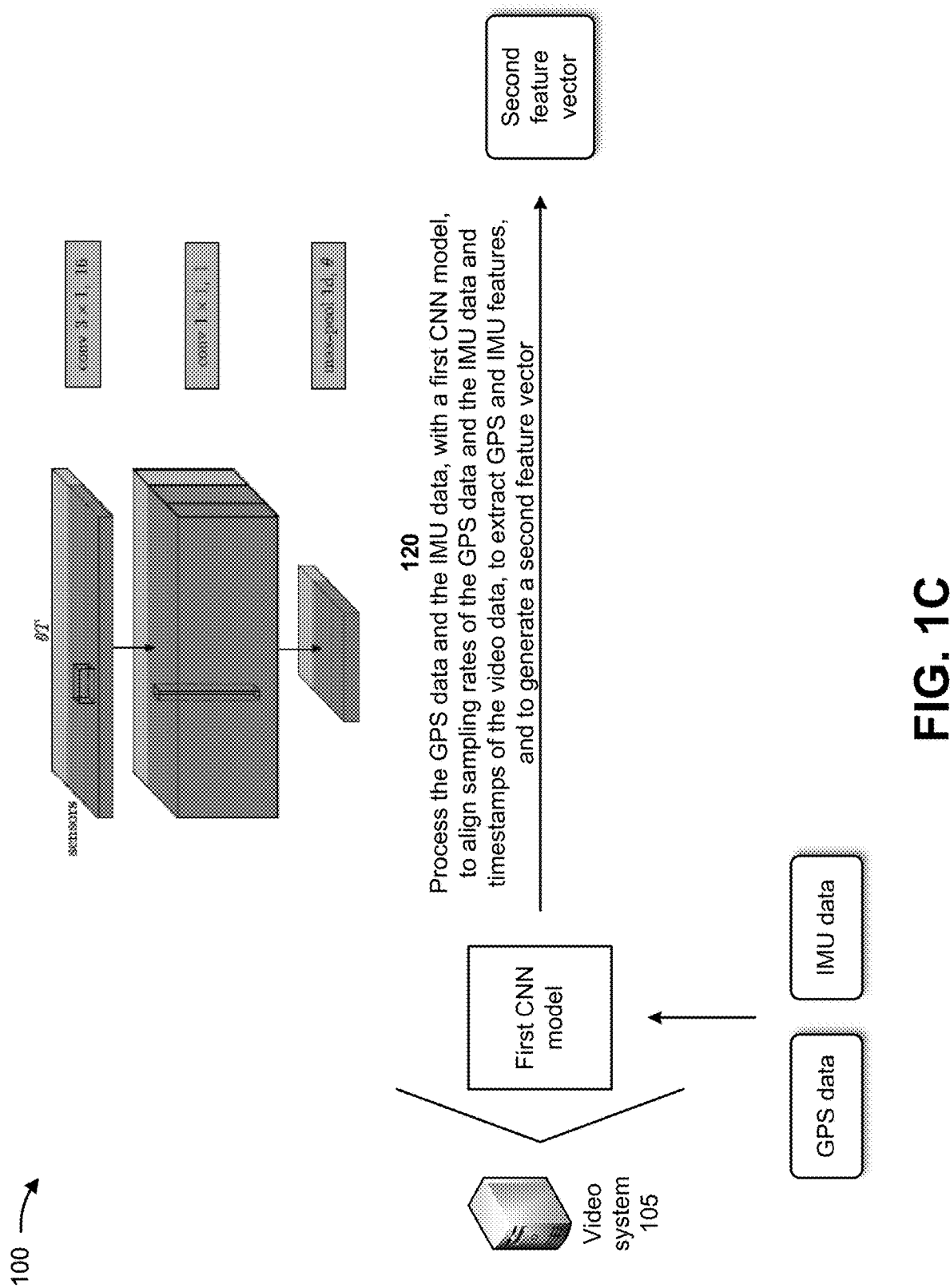

SYSTEMS AND METHODS FOR CLASSIFYING A VEHICLE MANEUVER USING A SPATIOTEMPORAL ATTENTION SELECTOR

BACKGROUND

An unsafe vehicle maneuver may include a maneuver that leads to a dangerous situation for the vehicle, other vehicles, pedestrians, and/or the like. Classifying a vehicle maneuver aims to classify a safety-critical event (i.e., crashes and near crashes), recorded from a vehicle dashcam, as being an unsafe vehicle maneuver or a safe vehicle maneuver.

BRIEF DESCRIPTION OF THE DRAWINGS

FIGS. 1A-1H are diagrams of an example associated with classifying a vehicle maneuver from video data, global positioning system (GPS) data, and inertial measurement unit (IMU) data using a spatiotemporal attention selector.

DETAILED DESCRIPTION OF EXAMPLE EMBODIMENTS

Figure 1A:
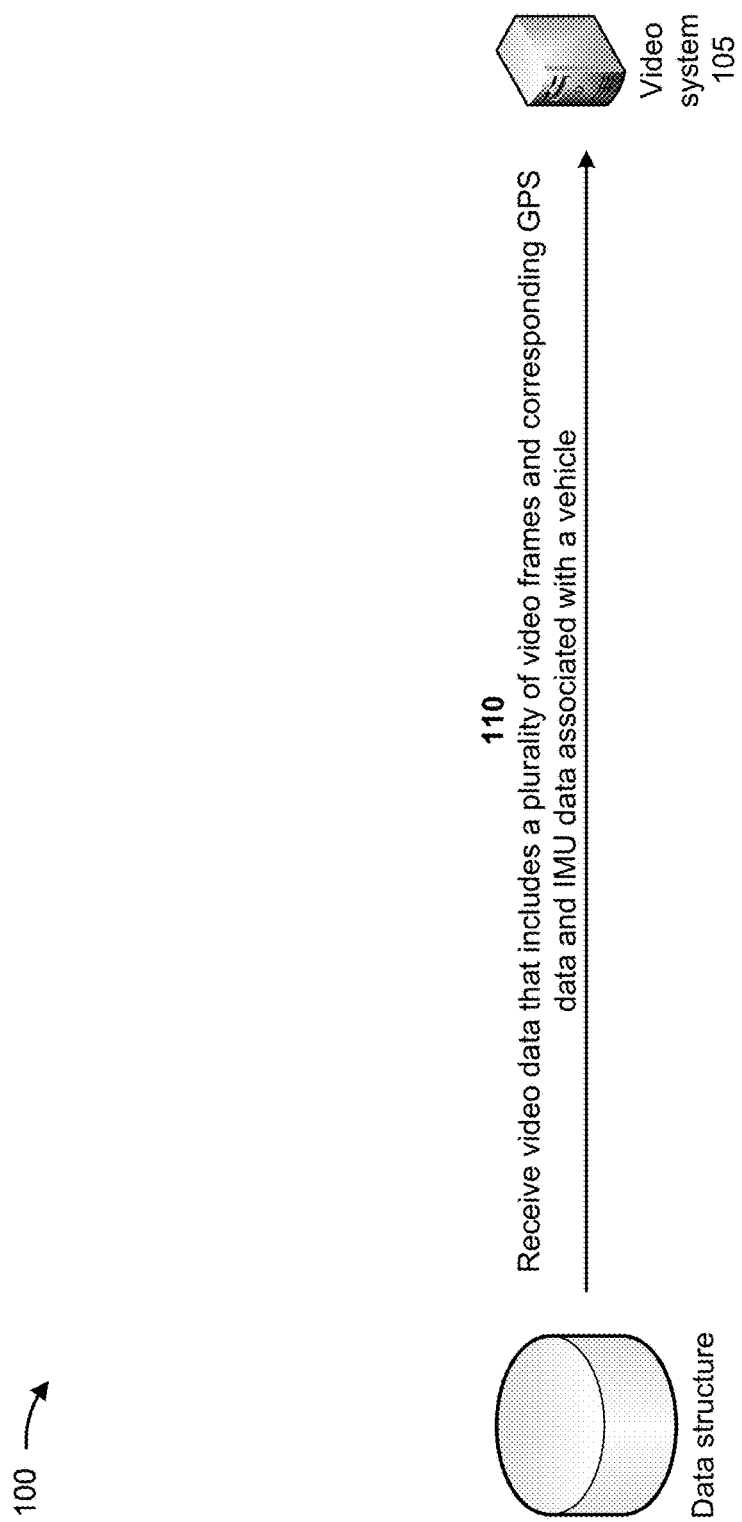

The following detailed description of example implementations refers to the accompanying drawings. The same reference numbers in different drawings may identify the same or similar elements.

Classifying unsafe vehicle maneuvers is important for several reasons. First, while road deaths are a major global problem, vehicle safety systems have shown to actively contribute to a reduction in a quantity of deaths and serious injuries. Thus, research in this field aimed at obtaining a better understanding of safety-critical events is crucial to mitigate the problem. Second, the research considers a broad set of maneuvers, performed both by a subject vehicle and by other vehicles, such as multiple-vehicle maneuvers or single-vehicle maneuvers (e.g., loss of vehicle control, vehicle over an edge of a road, and/or the like). Because of this broader consideration, current techniques for classifying vehicle maneuvers fail to utilize sensor data, such as GPS data and IMU data, and lack the contextual detail to accurately classify the vehicle maneuver. Thus, current techniques for classifying a vehicle maneuver consume computing resources (e.g., processing resources, memory resources, communication resources, and/or the like), networking resources, and/or other resources associated with failing to accurately classify vehicle maneuvers due to the lack of GPS data and IMU data, generating incorrect classifications of vehicle maneuvers, encouraging dangerous vehicle maneuvers based on the incorrect classifications, handling traffic accidents caused by the dangerous vehicle maneuvers, and/or the like.

Some implementations described herein relate to a video system that classifies a vehicle maneuver from sensor data (e.g., video data, GPS data, and IMU data) using spatiotemporal considerations (e.g., relating to both space (location) and time). For example, the video system may utilize a spatiotemporal attention selector model with video data that includes a plurality of video frames and corresponding GPS data and IMU data associated with a vehicle, and may process the video data, with an object detector model, to identify objects in the video data and to generate a first feature vector based on the objects. The video system may process the GPS data and the IMU data, with a first convolutional neural network (CNN) model, to generate a second feature vector, and may process the objects and the video data, with a tracking model, to identify positions and classes of the objects and to generate a third feature vector based on the positions and the classes. The video system may utilize a second CNN model to generate a matrix of object features based on the first feature vector, the second feature vector, and the third feature vector, and may utilize the spatiotemporal attention selector model or a max pooled model with the matrix of object features to identify a classification of a maneuver of the vehicle as safe or unsafe. The video system may perform one or more actions based on the classification.

In this way, the video system classifies a vehicle maneuver from video data, GPS data, and IMU data using a spatiotemporal considerations. For example, the video system may receive the video, the GPS data, and IMU data, and may utilize an object detector model to extract positions and types of objects from each frame of the video data and to extract appearance and positional features for each object. The video system may utilize a tracking model to link the same object in different frames of the video data, and may enrich the object features with the GPS data and the IMU data. The video system may apply a set of convolutional neural network models to each object in order to extract high-level descriptors for each of object and to reduce temporal dimensionality of the data. The video system may utilize a model (e.g., max pooled model) with the objects and temporal segments or may utilize a spatiotemporal attention selector model (e.g., that includes a multi-head attention layer) to select a most relevant object and temporal segment. The video system may generate a classification of a vehicle maneuver based on the most relevant object and temporal segment. Thus, the video system may conserve computing resources, networking resources, and/or other resources that would have otherwise been consumed by failing to accurately classify vehicle maneuvers due to the lack of GPS data and IMU data, generating incorrect classifications of vehicle maneuvers, encouraging dangerous vehicle maneuvers based on the incorrect classifications, handling traffic accidents caused by the dangerous vehicle maneuvers, and/or the like.

FIGS. 1A-1H are diagrams of an example 100 associated with classifying a vehicle maneuver from video data, GPS data, and IMU data using a spatiotemporal attention selector. As shown in FIGS. 1A-1H, example 100 includes a video system 105 associated with a data structure. The video system 105 may include a system that classifies a vehicle maneuver from video data, GPS data, and IMU data using a spatiotemporal attention selector. The data structure may include a database, a table, a list, and/or the like. Further details of the video system 105 and the data structure are provided elsewhere herein.

As shown in FIG. 1A, and by reference number 110, the video system 105 may receive video data that includes a plurality of video frames and corresponding GPS data (or global navigation satellite system (GNSS) data) and IMU data associated with a vehicle. For example, dashcams or other video devices of vehicles may record video data (e.g., video footage) of events associated with the vehicles. The video data may be recorded based on a trigger associated with the events. For example, a harsh event may be detected by an accelerometer mounted inside a vehicle (e.g., a kinematics trigger). Alternatively, a processing device of a vehicle may detect a potential danger for the vehicle (e.g., by use of a trained machine learning model) and request further processing to obtain the video data. Alternatively, a driver of a vehicle may cause the video data to be captured at a moment at which the event occurs. The vehicles or the video devices may store the video data in a data structure (e.g., a database, a table, a list, and/or the like). The vehicles may also include sensors, such as GPS sensors, IMU sensors, and/or the like. The vehicles may provide GPS data captured by the GPS sensors to the data structure. The GPS data may include data identifying GPS locations of the vehicles over time. The vehicles may also provide IMU data captured by the IMU sensors to the data structure. The IMU data may include data identifying acceleration measurements and angular velocity measurements of the vehicles over time.

The vehicles may repeatedly transfer the video data, the GPS data, and the IMU data to the data structure over time so that the data structure includes video data identifying videos associated with driving events (e.g., for the vehicles and/or the drivers of the vehicles), the GPS data identifying the GPS locations of the vehicles, and the IMU data identifying the acceleration and angular velocity measurements of the vehicles. In some implementations, the video system 105 may continuously receive the video data, the GPS data, and the IMU data associated with the vehicle from the data structure, may periodically receive the video data, the GPS data, and the IMU data associated with the vehicle from the data structure, may receive the video data, the GPS data, and the IMU data associated with the vehicle from the data structure based on requesting the video data, the GPS data, and the IMU data associated with the vehicle from the data structure, and/or the like.

Figure 1B:
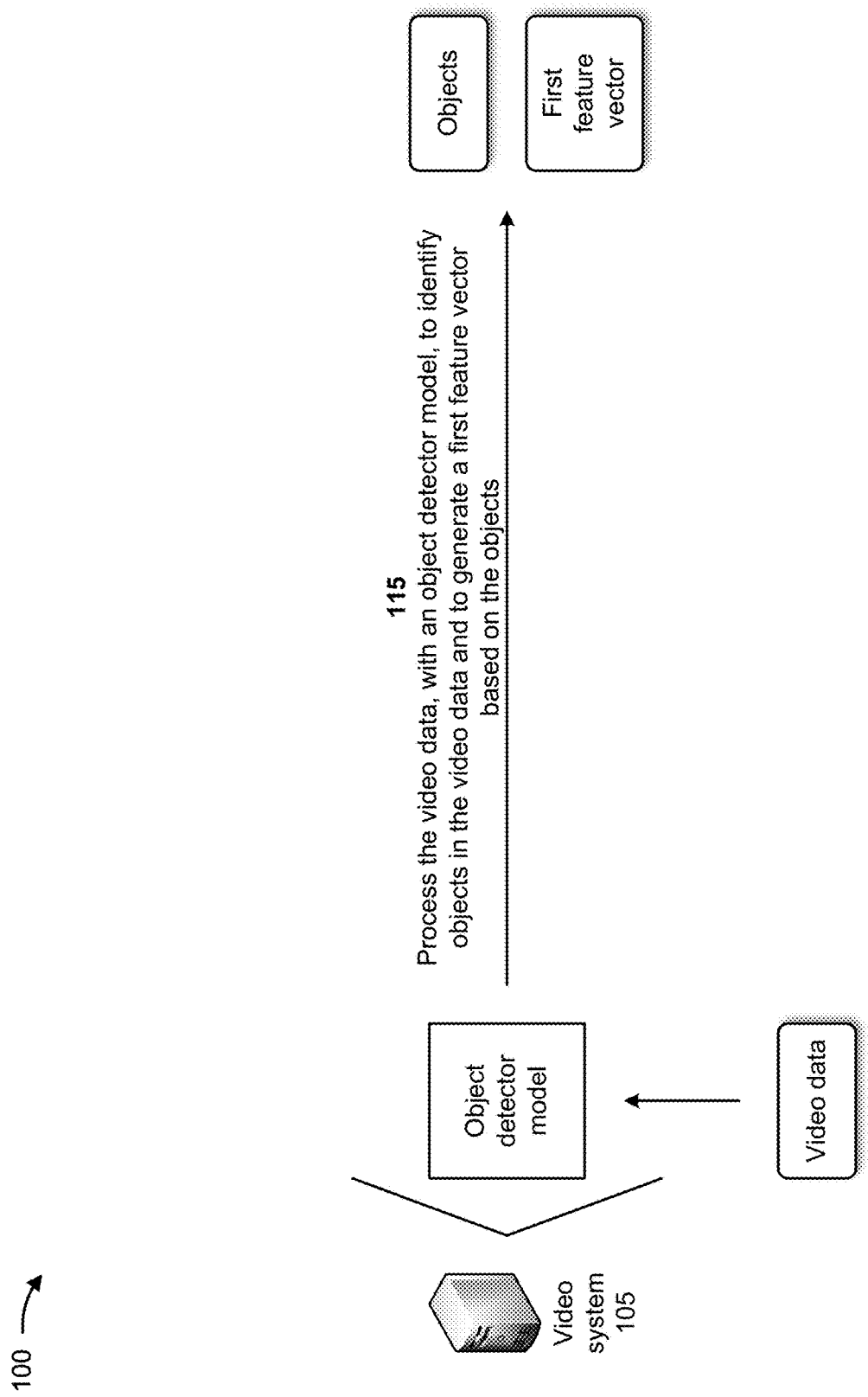

As shown in FIG. 1B, and by reference number 115, the video system 105 may process the video data, with an object detector model, to identify objects in the video data and to generate a first feature vector based on the objects. For example, the video system 105 may be associated with an object detector model, such as a faster region-based convolutional neural network (R-CNN) model and a residual neural network model (e.g., a ResNet-101 backbone). The video system 105 may utilize object detector model to identify the objects in the video data by extracting, from each video frame, object positions and classes. The ResNet-101 backbone of the object detector model may associate an appearance vector (e.g., the first feature vector) with the identified objects. The object detector model may extract a cropped portion of each image for each object and process the cropped portion of each image with the ResNet-101 backbone. However, this might result in prohibitive inference times. For example, to compute the features of a single frame with ten objects detected, the ResNet-101 backbone would need to compute ten backbone forward passes. During training, it is possible to speed up the process by locally storing outputs of the ResNet-101 backbone. However, when there are a lot of detections for each frame, this might also result in high storage costs. In some implementations, the object detector model may utilize a return on investment (ROI) pooling layer that computes object features with a single backbone forward pass during both training and inference.

As shown in FIG. 1C, and by reference number 120, the video system 105 may process the GPS data and the IMU data, with a first CNN model, to align sampling rates of the GPS data and the IMU data and timestamps of the video data, to extract GPS and IMU features, and to generate a second feature vector. For example, the video system 105 may be associated with a first CNN model that receives the GPS data and the IMU data, and aligns the sampling rates of the GPS data and the IMU data with the timestamps of the video data. The first CNN model may extract the GPS and IMU features based on aligning the sampling rates of the GPS data and the IMU data with the timestamps of the video data, and may generate the second feature vector based on the GPS and IMU features.

In some implementations, the first CNN model may resample the GPS data and the IMU data, via interpolation, so that the GPS data and the IMU data have the same quantity of samples (e.g., that is a multiple $\theta=3$ of the quantity of video data timestamps). The first CNN model may apply a set of convolutional operations, and may utilize a max pooling operation of size $\theta$ to align the sampling rates of the GPS data and the IMU data with the timestamps of the video data. The first CNN model may apply the same convolutional operation to process each signal independently to learn filters to be applied to a generic signal and to extract features describing a temporal evolution and preserving individual signal semantic meaning. In some implementations, the first CNN model includes two-dimensional depth-wise separable convolutions. Thus, starting from an input tensor of shape $\theta T \times s$, (e.g., where T is a number of frames and s is a number of sensor signals), the first CNN model may add an extra dimension to change the shape of the input tensor to $1 \times \theta T \times s$, with the first dimension representing a number of channels. The first CNN model may apply a two-dimensional convolution with a kernel size $k=3 \times 1$ and with $f=16$ output channels (i.e., filters). The output tensor, with padding over a temporal dimension to maintain a same spatial extent, may have a shape $f \times \theta T \times s$. The first CNN model applies a second two-dimensional convolution with kernel size $k=1 \times 1$ and with one output channel that is removed to return to a tensor of shape $\theta T \times s$. The first CNN model may utilize a single pair of convolutions so that each element of the output sensor retains a temporal receptive field (e.g., is computed based on sensor information around a single frame).

Figure 1D:
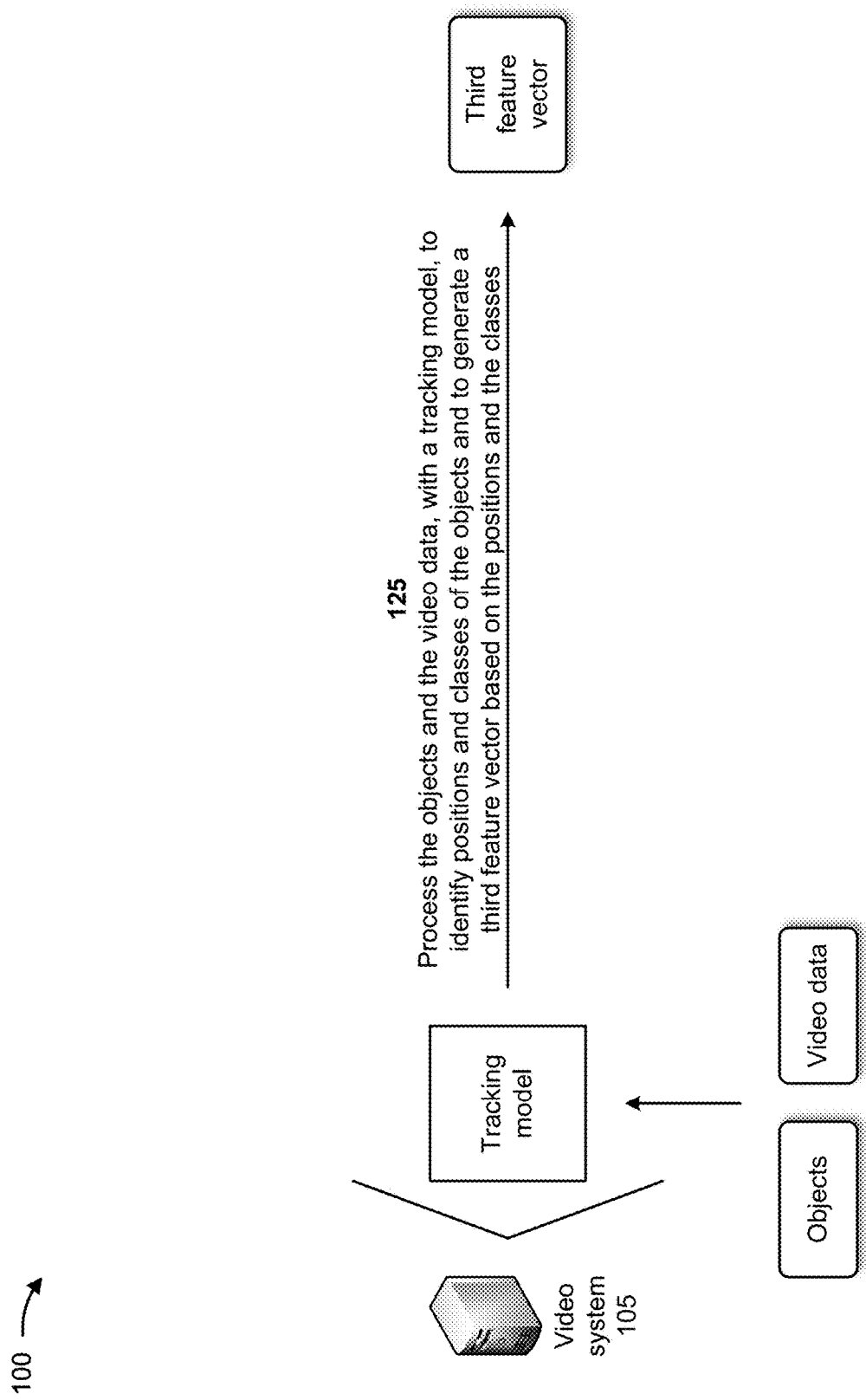

As shown in FIG. 1D, and by reference number 125, the video system 105 may process the objects and the video data, with a tracking model, to identify positions and classes of the objects and to generate a third feature vector based on the positions and the classes. For example, the video system 105 may be associated with a tracking model, such as a greedy tracking model that identifies the positions and the classes of the objects in the video data. The tracking model may generate the third feature vector based on the positions and the classes of the objects.

In one example, $o_t = \{o_{t,1}, \ldots, o_{t,N_t}\}$ may be the set of objects detected in a frame $t \in \{1, \ldots, T\}$, where $N_t$ is a total number of objects detected in frame t, $o_{t,i} = (a_{t,i}, p_{t,i})$, and $a_{t,i}$ and $p_{t,i}$ are respectively appearance features and positions of the i-th object detected in frame t. $o_{t,i}$ may be relative to the same real object (e.g., the same vehicle) for each frame t, with $(a_{t,i}, p_{t,i})$ vectors of zeros if the i-th object is not present or not detected in the frame t. Instead of considering a maximum quantity of detections N, for each frame t, a fixed quantity of detections $N_{objs}$ for each frame may be utilized, considering as zeros the extra objects for each video and discarding the extra objects. A detected object may be expressed as a matrix O of size $T \times N_{objs}$, with $o_{t,i} = (a_{t,i}, p_{t,i})$. As a heuristic to decide which objects to retain among the detected ones, the top $N_{objs}$ objects are considered according to a detection total volume (e.g., a sum of the detected area for each object $o_{t,i}$ for each frame t) and the $N_{objs}$ objects with the largest volumes are retained.

In order to build the matrix O, it is necessary to link the same real world object in two consecutive frames, $o_{t,i}$ and $o_{t+1,i}$, using, for example, the tracking model on the detected objects. The video system 105 may utilize a greedy tracking model that processes object positions, detection confidence, and class information. For example, starting from frame t=0, the tracking model may assign a unique tracking identifier to each object $o_{t,i}$ with a confidence $c_{t,i} \geq 0.6$. Then, iteratively for each following frame t, the tracking model may compute matching between the objects detected in frame t−1 and the objects detected in frame t and may assign to each matched object the same identifier. The tracking model may assign a new unique identifier to all unmatched objects in frame t with a confidence $c_{t,i} \geq 0.6$, and may discard all the remaining objects detected in frame t. The tracking model may first generate a set of candidate detected object pairs of the same class and with a confidence $c_{t,i} \geq 0.2$, and may iterate over the set to assign a matching for pairs with the highest values and to remove the matched object detections from the set. The tracking model may iterate so that each object in frame t−1 may be a match for at most one object in frame t (e.g., maximum bipartite matching).

Figure 1E:
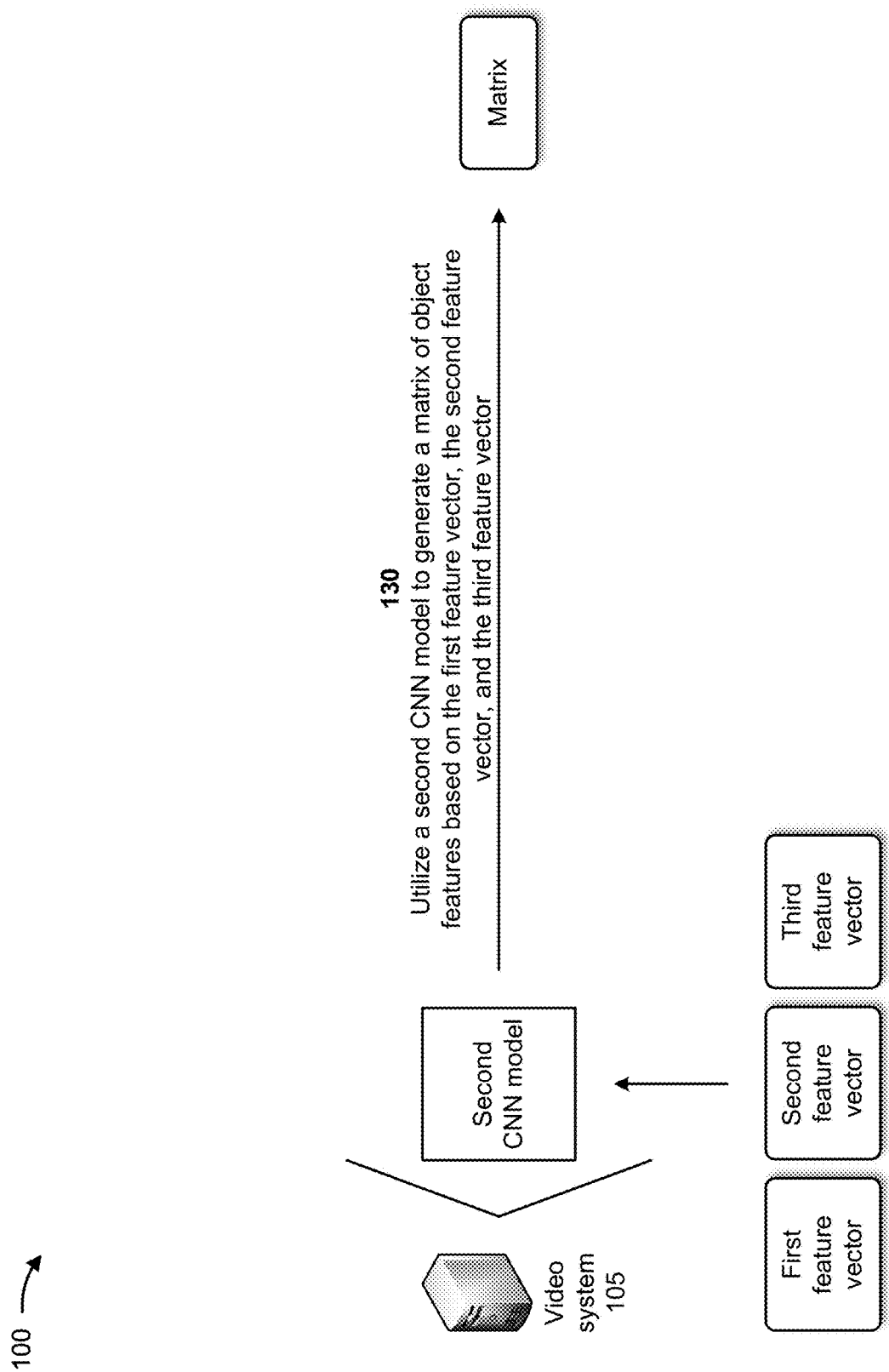

As shown in FIG. 1E, and by reference number 130, the video system 105 generates a matrix of object features based on the first feature vector, the second feature vector, and the third feature vector, e.g., utilizing a second CNN model. For example, the video system 105 may be associated with a second CNN model that combines the first feature vector, the second feature vector, and the third feature vector to generate the matrix of object features. In some implementations, each of the object features of the matrix is a concatenation of the first feature vector, the second feature vector, and the third feature vector.

In one example, starting from the matrix O, the second CNN model may build an object matrix X of shape $T \times N_{objs}$, where each element $x_{t,i}$ is the concatenation of the three feature vectors:

$$x_{t,i} = [x_{t,i}^a | x_{t,i}^g | x_{t,i}^p]$$

where the first feature vector $x_{t,i}^a$ is relative to the appearance of the object and is obtained by providing feeding the output of the ROI pooling layer of the i-th object and of frame t to a bottleneck layer (e.g., a linear layer followed by a one-dimensional batch normalization layer and a ReLU activation, in order to reduce the dimensionality of the data and make the data comparable with the other stream). The second feature vector $x_{t,i}^g$, is an output of the first CNN model for frame t, as described above in connection with FIG. 1C, replicated for each object. The third feature vector $x_{t,i}^p$ is relative to the position and class of the detection, and may include the position of a top left corner of a box, normalized in [0, 1], where a normalized width and height of the box, the confidence of the detection, and an encoded vector may indicate a class of the object. In some implementations, the video system 105 may include a flag indicating whether or not a box i has been detected in frame t. When the flag indicates that the box has not been detected in the frame, the three feature vectors may include zeros. In some implementations, the video system 105 may include an extra object to the object matrix with only the second feature vector $x_{t,i}^g$. The extra object may be provided since a video may not include objects other than a subject vehicle.

A dynamic spatial attention (DSA) recurrent neural network (RNN) model may extract features that link together the objects in two consecutive frames $x_{t,i}$ and $x_{t+1,i}$. The DSA RNN model may utilize an attention mechanism to select a relevant object at each time step that are then provided to a recurrent layer (e.g., a long short-term memory (LSTM) network). The recurrent layer may connect the features of the frames $x_{t,i}$ and $x_{t+1,i}$ if the attention weights $\alpha_{t,i}$ and $\alpha_{t+1,i}$ on the same object are high. Even if this is the case, such a relation may be exploited in the very last stages of the DSA RNN model (e.g., in the recurrent layer). However, such an approach does not require explicit associations (i.e., tracking) between objects $o_{t,i}$ and $o_{t+1,i}$ since the DSA RNN model considers all the objects of a single frame in isolation and the output of the attention layer is independent from the ordering of the inputs.

In contrast, the video system 105 may extract object connections in the preliminary stages of the architecture since it allows a CNN model to extract features that consider the evolution over time of a single object (e.g., an object getting larger or an object moving from left to right). For this reason, after building the matrix X based on the three feature vectors, the video system 105 may extract features $y_{\tilde{t},i}$ related to the evolution of the objects in the scene. This may be accomplished by applying the same set of convolutional operations to each object. The video system 105 may utilize two-dimensional convolutional operations of size 3×1 on three frames and on a single object. The video system 105 may stack four convolutional layers with an increasing number of filters (e.g., f=64, 128, 256, and 512) followed by two-dimensional batch normalization, ReLU activation, and two-dimensional max pooling operations of size 2×1 in order to reduce the temporal dimension while increasing the number of filters. The result is a matrix Y of shape $\tilde{T} \times N_{objs}$, where each element $y_{\tilde{t},i}$ represents the evolution of an object i in a temporal segment t, with $\tilde{t} \in 1, \ldots, \tilde{T}$ indices of the reduced temporal dimension.

Figure 1F:
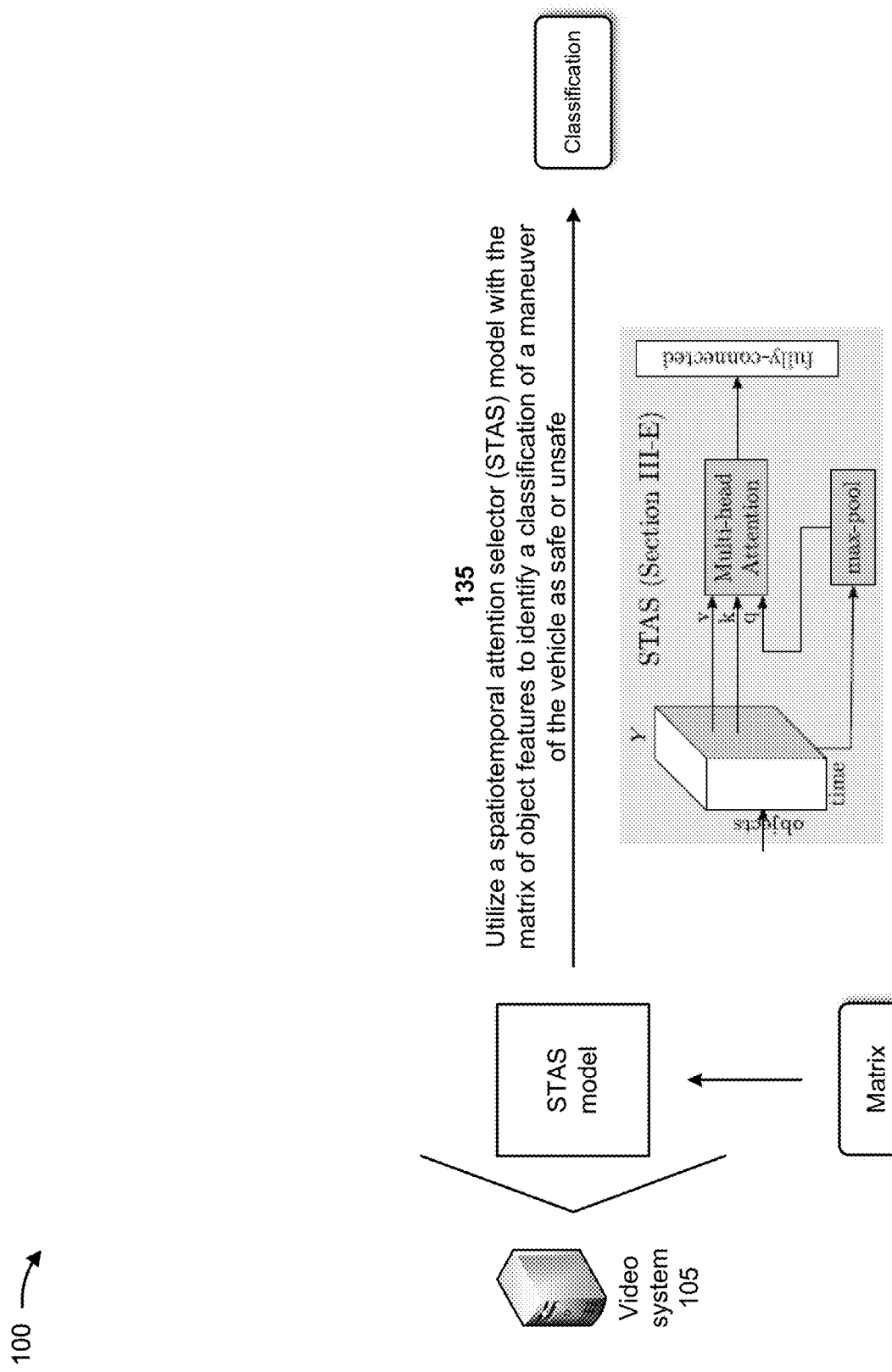

As shown in FIG. 1F, and by reference number 135, the video system 105 may utilize a spatiotemporal attention selector (STAS) model with the matrix of object features to identify a classification of a maneuver of the vehicle as safe or unsafe. For example, the video system 105 may process the matrix of object features, with the STAS model, to identify the classification of the maneuver of the vehicle as safe or unsafe. The STAS model may select the most relevant feature vectors $y_{\tilde{t},i}$ to perform the classification, and may include a multi-head attention layer. Starting from a set of vectors (e.g., keys, queries, and values), the multi-head attention layer may perform a weighted sum of values, where a weight assigned to each value is computed by a similarity function between the query and the corresponding key. A set of vectors $\{y_{\tilde{t},i}\}$ may be the keys and the values and two-dimensional global max pooling of the set of vectors may be the query. By pooling along a channel axis, the STAS model may obtain a vector that is representative of relevant object activations, which is effective in highlighting informative regions and to aides the classification task. By using such a vector as a query, the STAS model may be trained so that the attention weights are higher in correspondence to the object features that are the most similar to the pooled vector (e.g., where the object activations are higher and to the relevant objects). In one example, the key K, the query Q, and the value V matrices may be defined as follows:

$$Q = [\text{Max}Pool(y_{0,0}, \dots, y_{\hat{T}, N_{objs}})]$$

$$K = \begin{bmatrix} y_{0,0} \\ \dots \\ y_{\hat{T}, N_{objs}} \end{bmatrix}$$

$$V = \begin{bmatrix} y_{0,0} \\ \dots \\ y_{\hat{T}, N_{objs}} \end{bmatrix}.$$

The STAS model may utilize the multi-head attention layer, with a projection size $d_{model}=64$ and a number of heads h=8. For each head h, the layer may project the input vectors a reduced embedding space of size $d_{model}$, may compute a set of attention weights $\{\alpha_{\bar{t},i}{}^h\}$ (e.g., a similarity measure based on a dot product between each key and the query), and may utilize the attention weights to perform a weighted combination over the values. The resulting vectors $\varphi^h(Y; \alpha^h)$ for each head may be combined together using concatenation and a linear operation into a single vector $\varphi(Y; \alpha)$ that is used for the classification, while the weights $\alpha^h$ are averaged into a single vector $\alpha$ that is used for explanation.

Figure 1G:
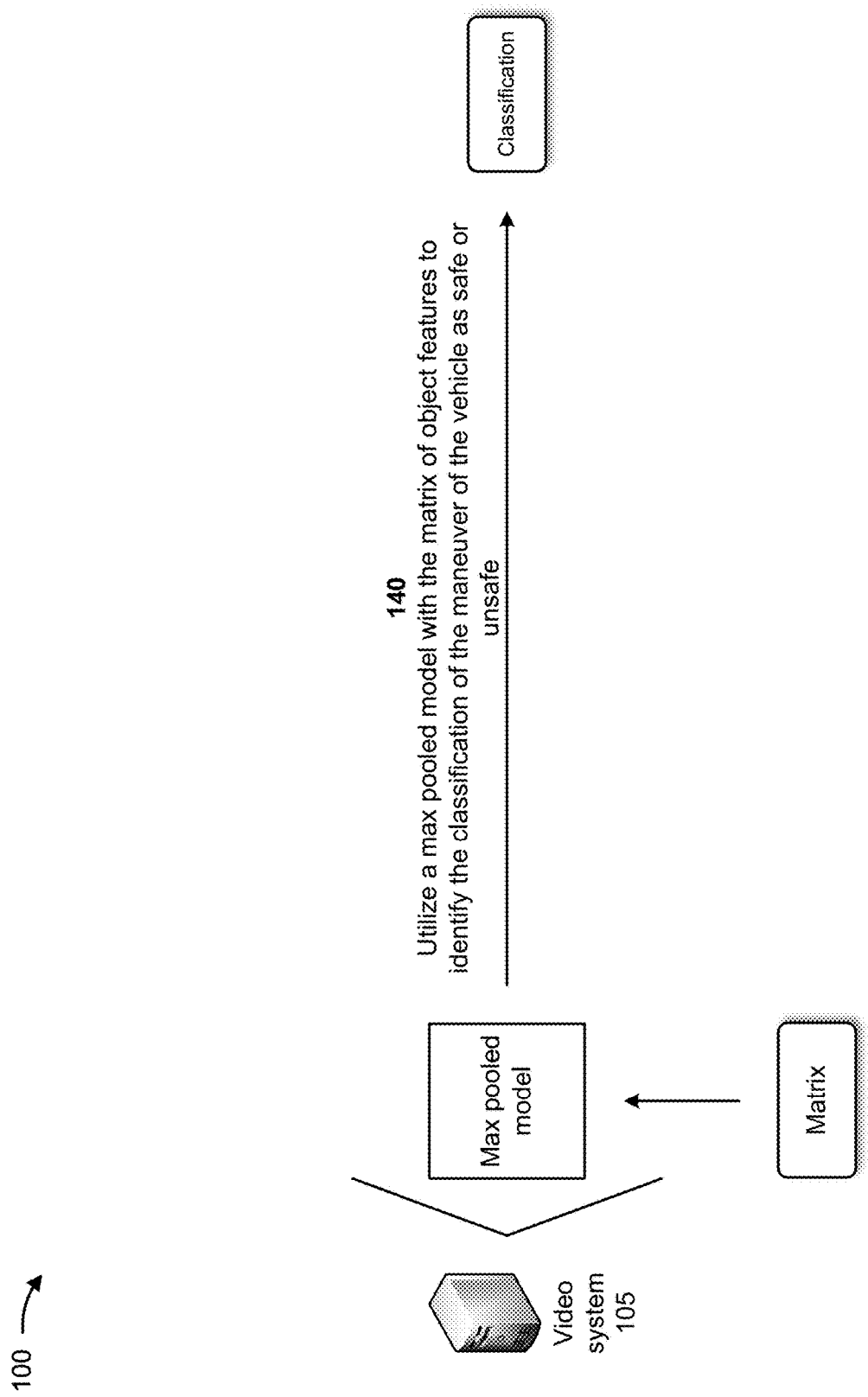

As shown in FIG. 1G, and by reference number 140, the video system 105 may utilize a max pooled model with the matrix of object features to identify the classification of the maneuver of the vehicle as safe or unsafe. For example, the video system 105 may process the matrix of object features, with the max pooled model (e.g., rather than the STAS model), to identify the classification of the maneuver of the vehicle as safe or unsafe. As an alternative, the video system 105 may utilize the max pooled model directly for the classification. When utilize the max pooled model, the features used for the classification may be pooled from any of the three feature vectors of matrix Y instead of being forced, by the attention layer, to belong mostly to a single feature vector. Relaxing such a constraint may improve performance at the expense of explanation.

While using a pretrained backbone to extract the object appearance feature showed good results, fine-tuning the backbone may improve the performance of the video system 105. However, when working with videos, it is difficult to fine-tune the backbone directly on the task, especially if the videos are long, as this generally requires larger datasets and more memory than available. In some implementations, the backbone may be fine-tuned on the same unsafe maneuver classification task but with a smaller version of the video with lower frame-rate and duration. Video segments may be randomly selected under the constraint that at least 75% of the video should be contained in the segment or all the frames should be event frames. This approach is possible only knowing the beginning and the end of a safety-critical event in each video. The video may be provided to the backbone and may be processed by a two-dimensional global average pooling layer. After these operations, an output tensor has a shape F×C, with F being the number of frames and C being the number of backbone output channels. In one example, ResNet-50 may include a number backbone output channels C=2048. Then, N=4 one-dimensional adaptations of the bottleneck layers of size C may be applied, where each of the bottleneck layers applies a point-wise one-dimensional convolution with C/4=512 filters, a one-dimensional convolution of size 3 and C/4=512 filters and a point-wise one-dimensional convolution with C=2048 filters, warping everything with a residual connection between the input of the three convolutions and the output. In addition to this, the temporal dimension may be gradually reduced. Thus, the first point-wise operation of each block may include a stride s=2 and each residual connection may include an additional pointwise operation to adjust the number of channels accordingly. Finally, a one-dimensional global max pooling layer may be applied over the reduced temporal dimension and the resulting vector may be utilized for classification.

Figure 1H:
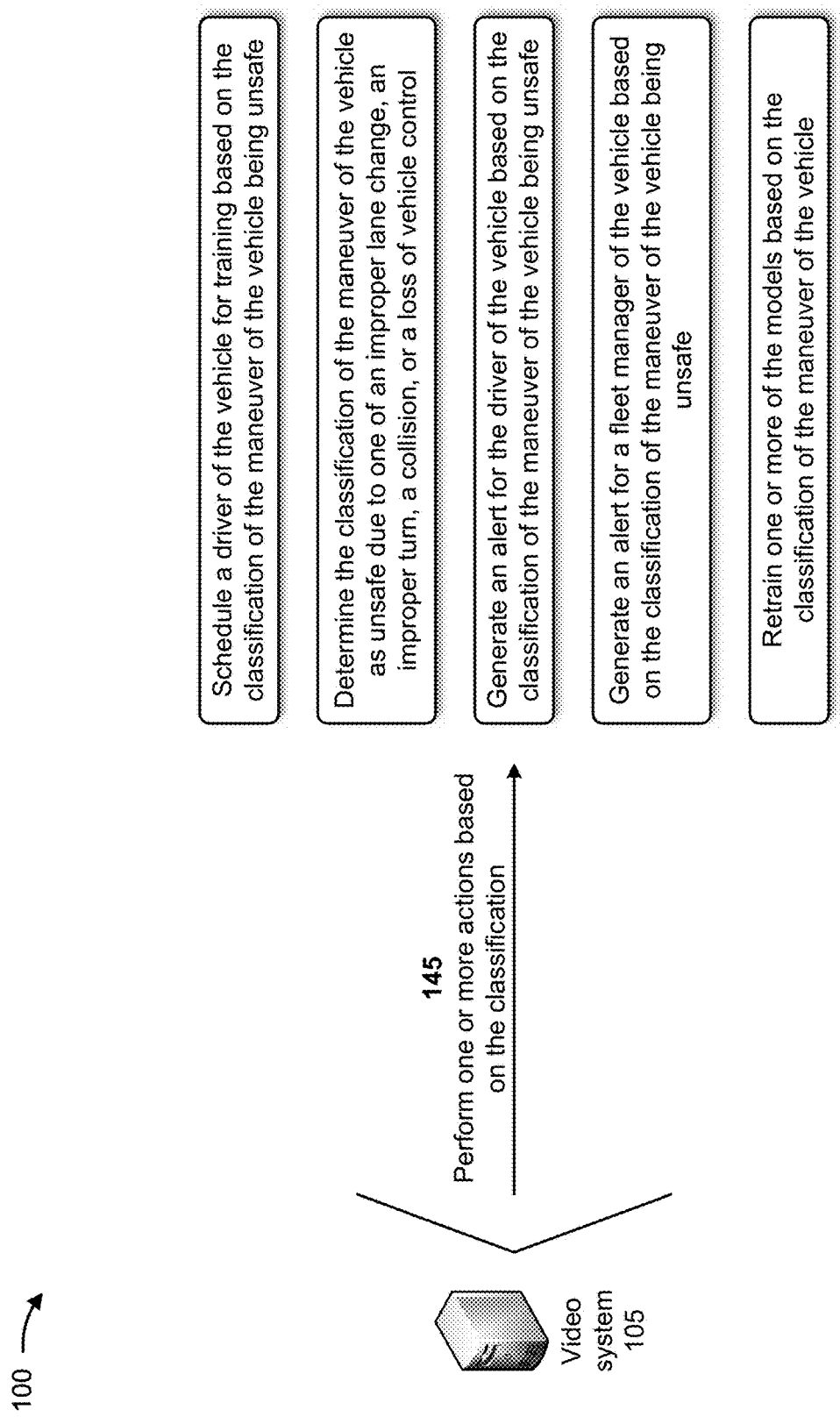

As shown in FIG. 1H, and by reference number 145, the video system 105 may perform one or more actions based on the classification. In some implementations, performing the one or more actions includes the video system 105 scheduling a driver of the vehicle for training based on the classification of the maneuver of the vehicle being unsafe. For example, if the video system 105 classifies the maneuver of the vehicle as unsafe, the video system 105 may schedule the driver of the vehicle for safety training associated with the unsafe maneuver. The driver may attend the safety training at the scheduled time in order to become a safer driver. In this way, the video system 105 conserves computing resources, networking resources, and/or other resources that would have otherwise been consumed by failing to accurately classify vehicle maneuvers due to the lack of GPS data and IMU data.

In some implementations, performing the one or more actions includes the video system 105 determining the classification of the maneuver of the vehicle as unsafe due to one of an improper lane change, an improper turn, a collision, or a loss of vehicle control. For example, if the vehicle performs an improper lane change, performs an improper turn, causes a collision, or loses control, the video system 105 may classify such maneuvers as unsafe. The video system 105 may report such unsafe maneuvers to a fleet manager of the vehicle, to an insurance company, and/or the like. In this way, the video system 105 conserves computing resources, networking resources, and/or other resources that would have otherwise been consumed by generating incorrect classifications of vehicle maneuvers.

In some implementations, performing the one or more actions includes the video system 105 generating an alert for the driver of the vehicle based on the classification of the maneuver of the vehicle being unsafe. For example, if the video system 105 determines that the classification of the maneuver of the vehicle is unsafe, the video system 105 may generate an alert (e.g., an audible alert, a text alert, and/or the like) for the driver of the vehicle, and may provide the alert to the vehicle, to a telephone of the driver, and/or the like. In this way, the video system 105 conserves computing resources, networking resources, and/or other resources that would have otherwise been consumed by encouraging dangerous vehicle maneuvers based on the incorrect classifications.

In some implementations, performing the one or more actions includes the video system 105 generating an alert for a fleet manager of the vehicle based on the classification of the maneuver of the vehicle being unsafe. For example, if the video system 105 determines that the classification of the maneuver of the vehicle is unsafe, the video system 105 may generate an alert (e.g., an audible alert, a text alert, and/or the like) for the fleet manager of the vehicle, and may provide the alert to the fleet manager. In this way, the video system 105 conserves computing resources, networking resources, and/or other resources that would have otherwise been consumed by handling traffic accidents caused by the dangerous vehicle maneuvers.

In some implementations, performing the one or more actions includes the video system 105 retraining one or more of the models based on the classification of the maneuver of the vehicle. For example, the video system 105 may utilize the classification of the maneuver of the vehicle as additional training data for retraining the object detector model, the first CNN model, the tracking model, the second CNN model, the STAS model, and/or the max pooled model, thereby increasing the quantity of training data available for training the object detector model, the first CNN model, the tracking model, the second CNN model, the STAS model, and/or the max pooled model. Accordingly, the video system 105 may conserve computing resources associated with identifying, obtaining, and/or generating historical data for training the object detector model, the first CNN model, the tracking model, the second CNN model, the STAS model, and/or the max pooled model relative to other systems for identifying, obtaining, and/or generating historical data for training machine learning models.

In this way, the video system 105 classifies a vehicle maneuver from video data, GPS data, and IMU data using a spatiotemporal attention selector. For example, the video system 105 may receive the video, the GPS data, and IMU data, and may utilize an object detector model to extract positions and types of objects from each frame of the video data and to extract appearance and positional features for each object. The video system 105 may utilize a tracking model to link the same object in different frames of the video data, and may enrich the object features with the GPS data and the IMU data. The video system 105 may apply a set of convolutional neural network models to each object in order to extract high-level descriptors for each of object and to reduce temporal dimensionality of the data. The video system 105 may utilize a max pooled model with the objects and temporal segments or may utilize a spatiotemporal attention selector model (e.g., that includes a multi-head attention layer) to select a most relevant object and temporal segment. The video system 105 may generate a classification of a vehicle maneuver based on the most relevant object and temporal segment. Thus, the video system 105 may conserve computing resources, networking resources, and/or other resources that would have otherwise been consumed by failing to accurately classify vehicle maneuvers due to the lack of GPS data and IMU data, generating incorrect classifications of vehicle maneuvers, encouraging dangerous vehicle maneuvers based on the incorrect classifications, handling traffic accidents caused by the dangerous vehicle maneuvers, and/or the like.

As indicated above, FIGS. 1A-1H are provided as an example. Other examples may differ from what is described with regard to FIGS. 1A-1H. The number and arrangement of devices shown in FIGS. 1A-1H are provided as an example. In practice, there may be additional devices, fewer devices, different devices, or differently arranged devices than those shown in FIGS. 1A-1H. Furthermore, two or more devices shown in FIGS. 1A-1H may be implemented within a single device, or a single device shown in FIGS. 1A-1H may be implemented as multiple, distributed devices. Additionally, or alternatively, a set of devices (e.g., one or more devices) shown in FIGS. 1A-1H may perform one or more functions described as being performed by another set of devices shown in FIGS. 1A-1H.

Figure 2:
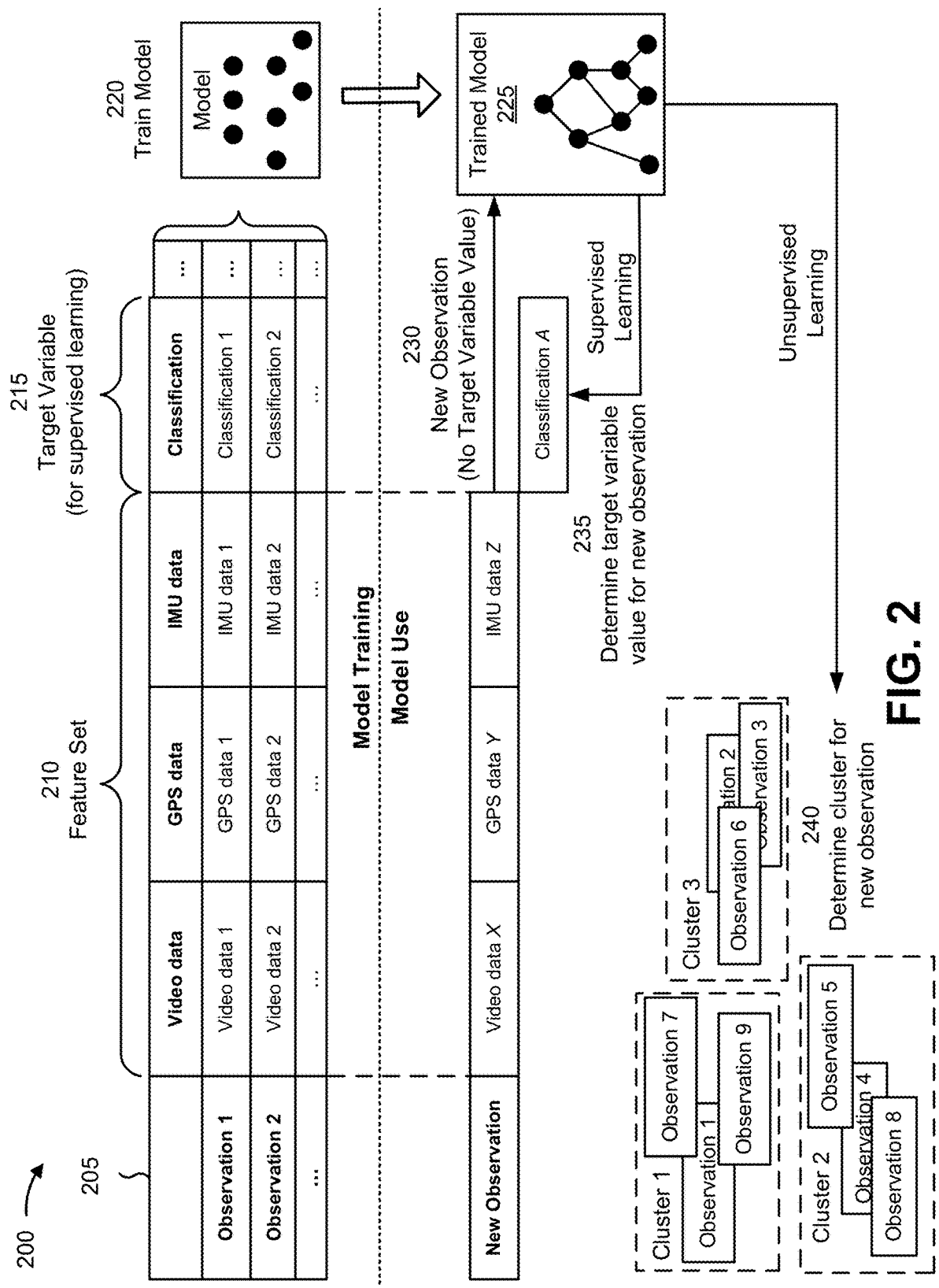
FIG. 2 is a diagram illustrating an example of training and using a machine learning model.

FIG. 2 is a diagram illustrating an example 200 of training and using a machine learning model. The machine learning model training and usage described herein may be performed using a machine learning system. The machine learning system may include or may be included in a computing device, a server, a cloud computing environment, or the like, such as the video system 105.

As shown by reference number 205, a machine learning model may be trained using a set of observations. The set of observations may be obtained from training data (e.g., historical data), such as data gathered during one or more processes described herein. In some implementations, the machine learning system may receive the set of observations (e.g., as input) from the video system 105, as described elsewhere herein.

As shown by reference number 210, the set of observations may include a feature set. The feature set may include a set of variables, and a variable may be referred to as a feature. A specific observation may include a set of variable values (or feature values) corresponding to the set of variables. In some implementations, the machine learning system may determine variables for a set of observations and/or variable values for a specific observation based on input received from the video system 105. For example, the machine learning system may identify a feature set (e.g., one or more features and/or feature values) by extracting the feature set from structured data, by performing natural language processing to extract the feature set from unstructured data, and/or by receiving input from an operator.

As an example, a feature set for a set of observations may include a first feature of video data, a second feature of GPS data, a third feature of IMU data, and so on. As shown, for a first observation, the first feature may have a value of video data 1, the second feature may have a value of GPS data 1, the third feature may have a value of IMU data 1, and so on. These features and feature values are provided as examples, and may differ in other examples.

As shown by reference number 215, the set of observations may be associated with a target variable. The target variable may represent a variable having a numeric value, may represent a variable having a numeric value that falls within a range of values or has some discrete possible values, may represent a variable that is selectable from one of multiple options (e.g., one of multiples classes, classifications, or labels) and/or may represent a variable having a Boolean value. A target variable may be associated with a target variable value, and a target variable value may be specific to an observation. In example 200, the target variable is a classification, which has a value of classification 1 for the first observation. The feature set and target variable described above are provided as examples, and other examples may differ from what is described above.

The target variable may represent a value that a machine learning model is being trained to predict, and the feature set may represent the variables that are input to a trained machine learning model to predict a value for the target variable. The set of observations may include target variable values so that the machine learning model can be trained to recognize patterns in the feature set that lead to a target variable value. A machine learning model that is trained to predict a target variable value may be referred to as a supervised learning model.

In some implementations, the machine learning model may be trained on a set of observations that do not include a target variable. This may be referred to as an unsupervised learning model. In this case, the machine learning model may learn patterns from the set of observations without labeling or supervision, and may provide output that indicates such patterns, such as by using clustering and/or association to identify related groups of items within the set of observations.

As shown by reference number 220, the machine learning system may train a machine learning model using the set of observations and using one or more machine learning algorithms, such as a regression algorithm, a decision tree algorithm, a neural network algorithm, a k-nearest neighbor algorithm, a support vector machine algorithm, or the like. After training, the machine learning system may store the machine learning model as a trained machine learning model 225 to be used to analyze new observations.

As shown by reference number 230, the machine learning system may apply the trained machine learning model 225 to a new observation, such as by receiving a new observation and inputting the new observation to the trained machine learning model 225. As shown, the new observation may include a first feature of video data X, a second feature of GPS data Y, a third feature of IMU data Z, and so on, as an example. The machine learning system may apply the trained machine learning model 225 to the new observation to generate an output (e.g., a result). The type of output may depend on the type of machine learning model and/or the type of machine learning task being performed. For example, the output may include a predicted value of a target variable, such as when supervised learning is employed. Additionally, or alternatively, the output may include information that identifies a cluster to which the new observation belongs and/or information that indicates a degree of similarity between the new observation and one or more other observations, such as when unsupervised learning is employed.

As an example, the trained machine learning model 225 may predict a value of classification A for the target variable of classification for the new observation, as shown by reference number 235. Based on this prediction, the machine learning system may provide a first recommendation, may provide output for determination of a first recommendation, may perform a first automated action, and/or may cause a first automated action to be performed (e.g., by instructing another device to perform the automated action), among other examples.

In some implementations, the trained machine learning model 225 may classify (e.g., cluster) the new observation in a cluster, as shown by reference number 240. The observations within a cluster may have a threshold degree of similarity. As an example, if the machine learning system classifies the new observation in a first cluster (e.g., a video data cluster), then the machine learning system may provide a first recommendation. Additionally, or alternatively, the machine learning system may perform a first automated action and/or may cause a first automated action to be performed (e.g., by instructing another device to perform the automated action) based on classifying the new observation in the first cluster.

As another example, if the machine learning system were to classify the new observation in a second cluster (e.g., a GPS data cluster), then the machine learning system may provide a second (e.g., different) recommendation and/or may perform or cause performance of a second (e.g., different) automated action.

In some implementations, the recommendation and/or the automated action associated with the new observation may be based on a target variable value having a particular label (e.g., classification or categorization), may be based on whether a target variable value satisfies one or more threshold (e.g., whether the target variable value is greater than a threshold, is less than a threshold, is equal to a threshold, falls within a range of threshold values, or the like), and/or may be based on a cluster in which the new observation is classified.

In some implementations, the trained machine learning model 225 may be re-trained using feedback information. For example, feedback may be provided to the machine learning model. The feedback may be associated with actions performed based on the recommendations provided by the trained machine learning model 225 and/or automated actions performed, or caused, by the trained machine learning model 225. In other words, the recommendations and/or actions output by the trained machine learning model 225 may be used as inputs to re-train the machine learning model (e.g., a feedback loop may be used to train and/or update the machine learning model).

In this way, the machine learning system may apply a rigorous and automated process to classify a vehicle maneuver from video data, GPS data, and IMU data. The machine learning system may enable recognition and/or identification of tens, hundreds, thousands, or millions of features and/or feature values for tens, hundreds, thousands, or millions of observations, thereby increasing accuracy and consistency and reducing delay associated with classifying a vehicle maneuver from video data, GPS data, and IMU data relative to requiring computing resources to be allocated for tens, hundreds, or thousands of operators to manually classify a vehicle maneuver from video data, GPS data, and IMU data.

As indicated above, FIG. 2 is provided as an example. Other examples may differ from what is described in connection with FIG. 2.

Figure 3:
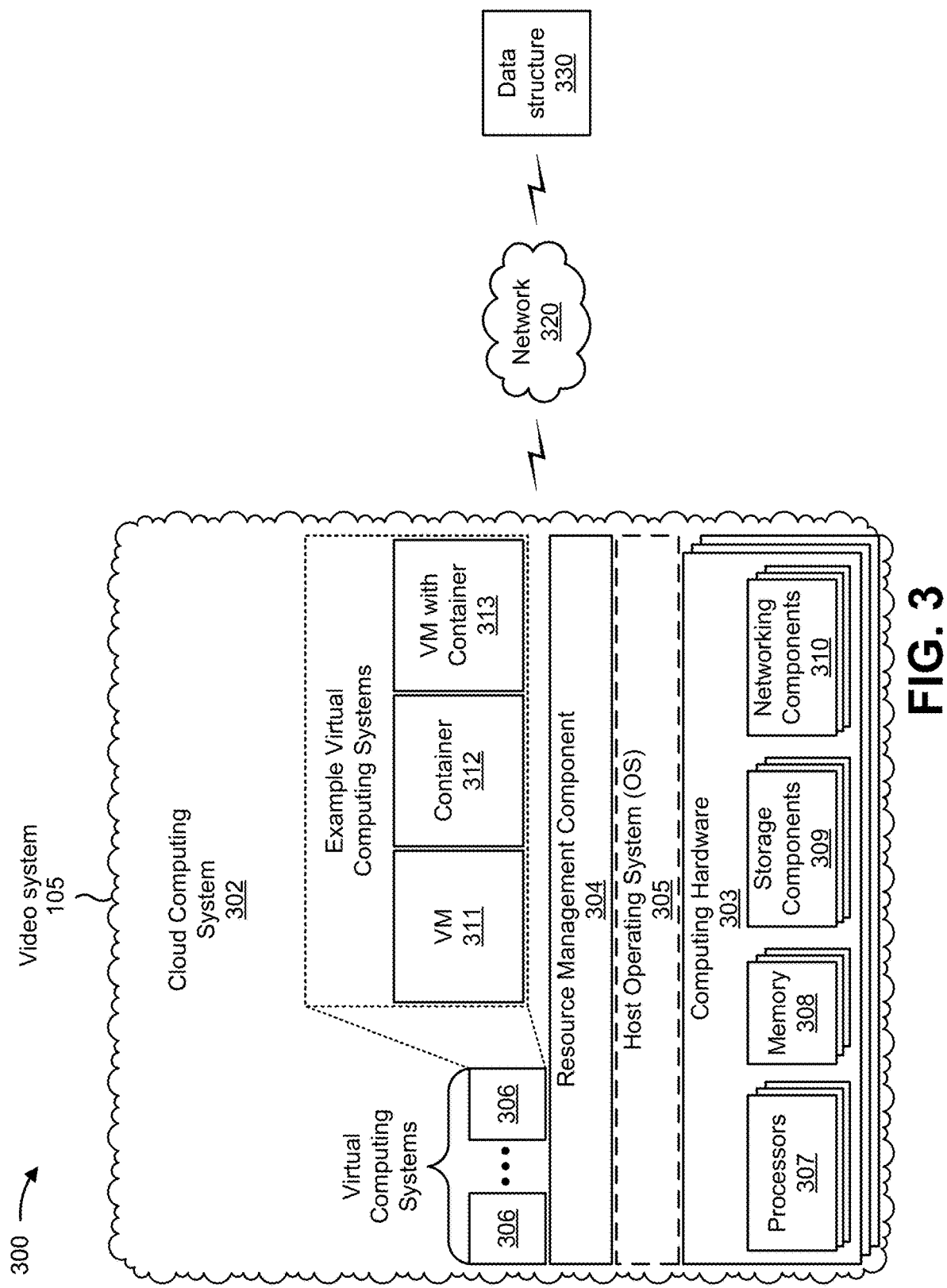
FIG. 3 is a diagram of an example environment in which systems and/or methods described herein may be implemented.

FIG. 3 is a diagram of an example environment 300 in which systems and/or methods described herein may be implemented. As shown in FIG. 3, the environment 300 may include the video system 105, which may include one or more elements of and/or may execute within a cloud computing system 302. The cloud computing system 302 may include one or more elements 303-313, as described in more detail below. As further shown in FIG. 3, the environment 300 may include a network 320 and/or a data structure 330. Devices and/or elements of the environment 300 may interconnect via wired connections and/or wireless connections.

The cloud computing system 302 includes computing hardware 303, a resource management component 304, a host operating system (OS) 305, and/or one or more virtual computing systems 306. The cloud computing system 302 may execute on, for example, an Amazon Web Services platform, a Microsoft Azure platform, or a Snowflake platform. The resource management component 304 may perform virtualization (e.g., abstraction) of the computing hardware 303 to create the one or more virtual computing systems 306. Using virtualization, the resource management component 304 enables a single computing device (e.g., a computer or a server) to operate like multiple computing devices, such as by creating multiple isolated virtual computing systems 306 from the computing hardware 303 of the single computing device. In this way, the computing hardware 303 can operate more efficiently, with lower power consumption, higher reliability, higher availability, higher utilization, greater flexibility, and lower cost than using separate computing devices.

The computing hardware 303 includes hardware and corresponding resources from one or more computing devices. For example, the computing hardware 303 may include hardware from a single computing device (e.g., a single server) or from multiple computing devices (e.g., multiple servers), such as multiple computing devices in one or more data centers. As shown, the computing hardware 303 may include one or more processors 307, one or more memories 308, one or more storage components 309, and/or one or more networking components 310. Examples of a processor, a memory, a storage component, and a networking component (e.g., a communication component) are described elsewhere herein.

The resource management component 304 includes a virtualization application (e.g., executing on hardware, such as the computing hardware 303) capable of virtualizing computing hardware 303 to start, stop, and/or manage one or more virtual computing systems 306. For example, the resource management component 304 may include a hypervisor (e.g., a bare-metal or Type 1 hypervisor, a hosted or Type 2 hypervisor, or another type of hypervisor) or a virtual machine monitor, such as when the virtual computing systems 306 are virtual machines 311. Additionally, or alternatively, the resource management component 304 may include a container manager, such as when the virtual computing systems 306 are containers 312. In some implementations, the resource management component 304 executes within and/or in coordination with a host operating system 305.

A virtual computing system 306 includes a virtual environment that enables cloud-based execution of operations and/or processes described herein using the computing hardware 303. As shown, the virtual computing system 306 may include a virtual machine 311, a container 312, or a hybrid environment 313 that includes a virtual machine and a container, among other examples. The virtual computing system 306 may execute one or more applications using a file system that includes binary files, software libraries, and/or other resources required to execute applications on a guest operating system (e.g., within the virtual computing system 306) or the host operating system 305.

Although the video system 105 may include one or more elements 303-313 of the cloud computing system 302, may execute within the cloud computing system 302, and/or may be hosted within the cloud computing system 302, in some implementations, the video system 105 may not be cloud-based (e.g., may be implemented outside of a cloud computing system) or may be partially cloud-based. For example, the video system 105 may include one or more devices that are not part of the cloud computing system 302, such as a device 400 of FIG. 4, which may include a standalone server or another type of computing device. The video system 105 may perform one or more operations and/or processes described in more detail elsewhere herein.

The network 320 includes one or more wired and/or wireless networks. For example, the network 320 may include a cellular network, a public land mobile network (PLMN), a local area network (LAN), a wide area network (WAN), a private network, the Internet, and/or a combination of these or other types of networks. The network 320 enables communication among the devices of the environment 300.

The data structure 330 may include one or more devices capable of receiving, generating, storing, processing, and/or providing information, as described elsewhere herein. The data structure 330 may include a communication device and/or a computing device. For example, the data structure 330 may include a database, a server, a database server, an application server, a client server, a web server, a host server, a proxy server, a virtual server (e.g., executing on computing hardware), a server in a cloud computing system, a device that includes computing hardware used in a cloud computing environment, or a similar type of device. The data structure 330 may communicate with one or more other devices of environment 300, as described elsewhere herein.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of the environment 300 may perform one or more functions described as being performed by another set of devices of the environment 300.

Figure 4:
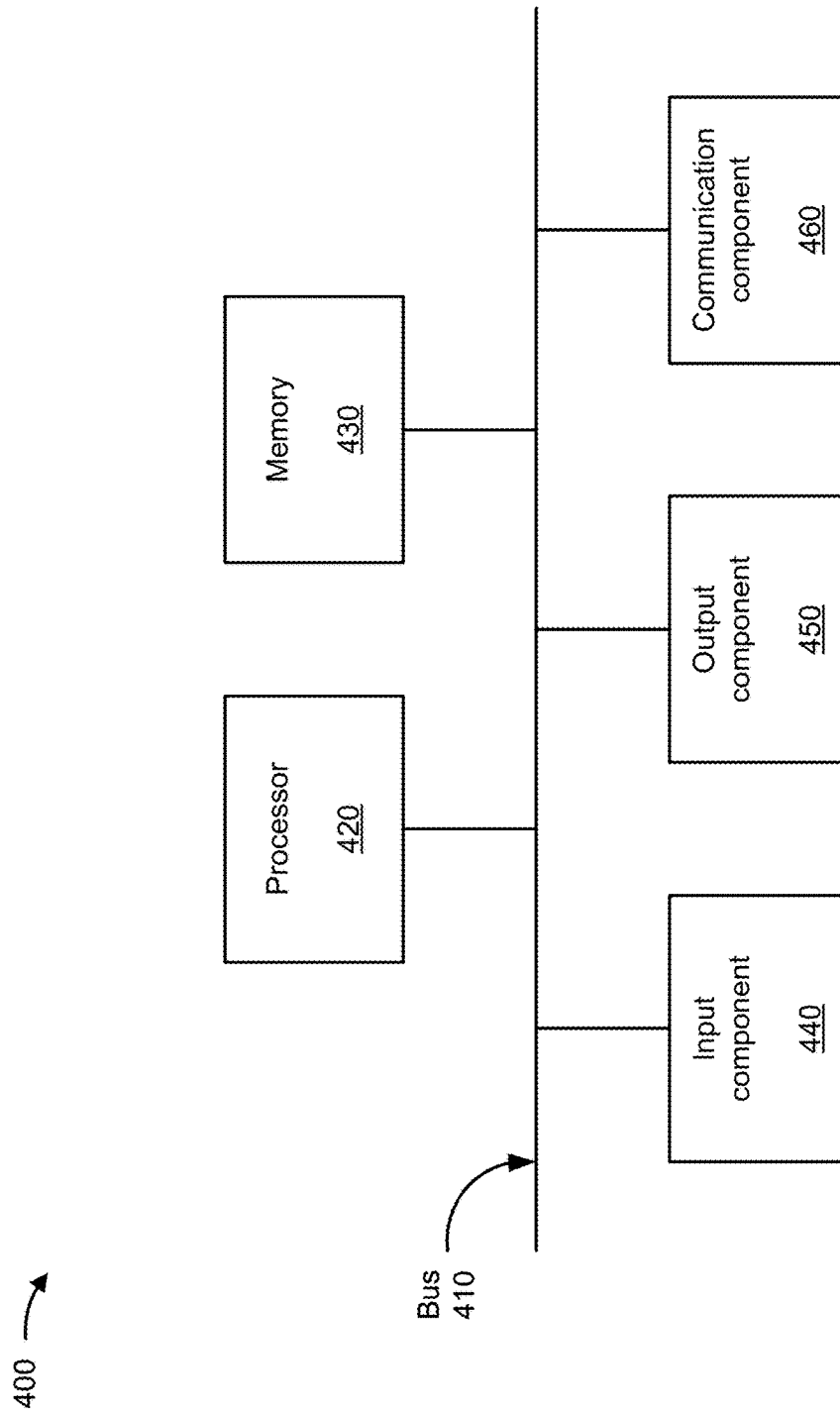
FIG. 4 is a diagram of example components of one or more devices of FIG. 3.

FIG. 4 is a diagram of example components of a device 400, which may correspond to the video system 105 and/or the data structure 330. In some implementations, the video system 105 and/or the data structure 330 may include one or more devices 400 and/or one or more components of the device 400. As shown in FIG. 4, the device 400 may include a bus 410, a processor 420, a memory 430, an input component 440, an output component 450, and a communication component 460.

The bus 410 includes one or more components that enable wired and/or wireless communication among the components of the device 400. The bus 410 may couple together two or more components of FIG. 4, such as via operative coupling, communicative coupling, electronic coupling, and/or electric coupling. The processor 420 includes a central processing unit, a graphics processing unit, a microprocessor, a controller, a microcontroller, a digital signal processor, a field-programmable gate array, an application-specific integrated circuit, and/or another type of processing component. The processor 420 is implemented in hardware, firmware, or a combination of hardware and software. In some implementations, the processor 420 includes one or more processors capable of being programmed to perform one or more operations or processes described elsewhere herein.

The memory 430 includes volatile and/or nonvolatile memory. For example, the memory 430 may include random access memory (RAM), read only memory (ROM), a hard disk drive, and/or another type of memory (e.g., a flash memory, a magnetic memory, and/or an optical memory). The memory 430 may include internal memory (e.g., RAM, ROM, or a hard disk drive) and/or removable memory (e.g., removable via a universal serial bus connection). The memory 430 may be a non-transitory computer-readable medium. The memory 430 stores information, instructions, and/or software (e.g., one or more software applications) related to the operation of the device 400. In some implementations, the memory 430 includes one or more memories that are coupled to one or more processors (e.g., the processor 420), such as via the bus 410.

The input component 440 enables the device 400 to receive input, such as user input and/or sensed input. For example, the input component 440 may include a touch screen, a keyboard, a keypad, a mouse, a button, a microphone, a switch, a sensor, a global positioning system sensor, an accelerometer, a gyroscope, and/or an actuator. The output component 450 enables the device 400 to provide output, such as via a display, a speaker, and/or a light-emitting diode. The communication component 460 enables the device 400 to communicate with other devices via a wired connection and/or a wireless connection. For example, the communication component 460 may include a receiver, a transmitter, a transceiver, a modem, a network interface card, and/or an antenna.

The device 400 may perform one or more operations or processes described herein. For example, a non-transitory computer-readable medium (e.g., the memory 430) may store a set of instructions (e.g., one or more instructions or code) for execution by the processor 420. The processor 420 may execute the set of instructions to perform one or more operations or processes described herein. In some implementations, execution of the set of instructions, by one or more processors 420, causes the one or more processors 420 and/or the device 400 to perform one or more operations or processes described herein. In some implementations, hardwired circuitry may be used instead of or in combination with the instructions to perform one or more operations or processes described herein. Additionally, or alternatively, the processor 420 may be configured to perform one or more operations or processes described herein. Thus, implementations described herein are not limited to any specific combination of hardware circuitry and software.

The number and arrangement of components shown in FIG. 4 are provided as an example. The device 400 may include additional components, fewer components, different components, or differently arranged components than those shown in FIG. 4. Additionally, or alternatively, a set of components (e.g., one or more components) of the device 400 may perform one or more functions described as being performed by another set of components of the device 400.

Figure 5:
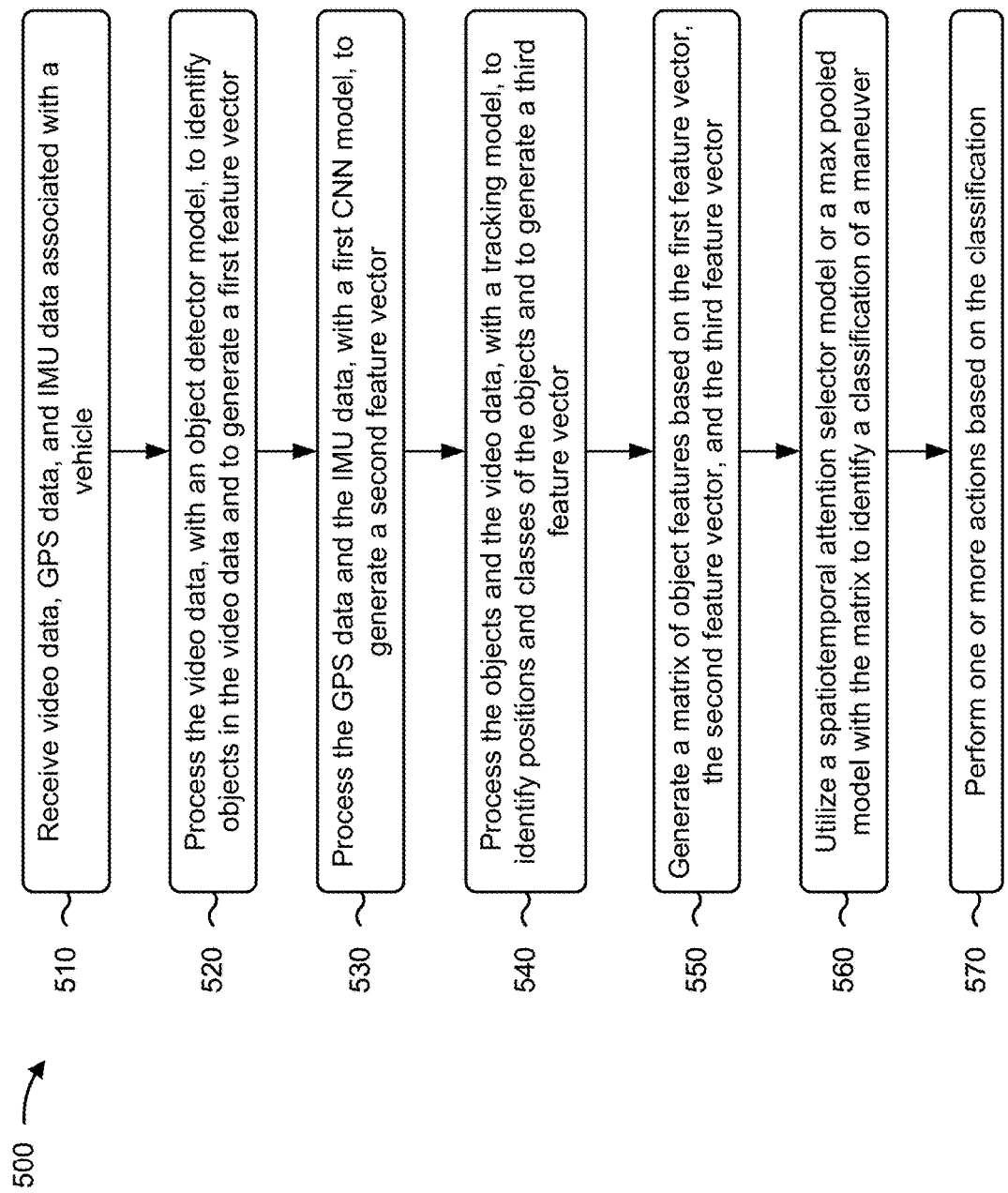
FIG. 5 is a flowchart of an example process for classifying a vehicle maneuver from video data, GPS data, and IMU data using a spatiotemporal attention selector.

FIG. 5 depicts a flowchart of an example process 500 for classifying a vehicle maneuver from video data, GPS data, and IMU data using a spatiotemporal attention selector. In some implementations, one or more process blocks of FIG. 5 may be performed by a device (e.g., the video system 105). In some implementations, one or more process blocks of FIG. 5 may be performed by another device or a group of devices separate from or including the device. Additionally, or alternatively, one or more process blocks of FIG. 5 may be performed by one or more components of the device 400, such as the processor 420, the memory 430, the input component 440, the output component 450, and/or the communication component 460.

As shown in FIG. 5, process 500 may include receiving video data, GPS data, and IMU data associated with a vehicle (block 510). For example, the device may receive video data that includes a plurality of video frames and corresponding GPS data and IMU data associated with a vehicle, as described above.

As further shown in FIG. 5, process 500 may include processing the video data, with an object detector model, to identify objects in the video data and to generate a first feature vector (block 520). For example, the device may process the video data, with an object detector model, to identify objects in the video data and to generate a first feature vector based on the objects, as described above. In some implementations, the object detector model includes a faster region-based convolutional neural network model and a residual neural network model.

As further shown in FIG. 5, process 500 may include processing the GPS data and the IMU data, with a first CNN model, to generate a second feature vector (block 530). For example, the device may process the GPS data and the IMU data, with a first CNN model, to generate a second feature vector, as described above. In some implementations, processing the GPS data and the IMU data, with the first CNN model, to generate the second feature vector includes processing the GPS data and the IMU data, with a first CNN model, to align sampling rates of the GPS data and the IMU data and timestamps of the video data, to extract GPS and IMU features, and to generate the second feature vector based on aligning the sampling rates and the timestamps and based on the GPS and IMU features. In some implementations, the first CNN model includes two-dimensional depthwise separable convolutions.

As further shown in FIG. 5, process 500 may include processing the objects and the video data, with a tracking model, to identify positions and classes of the objects and to generate a third feature vector (block 540). For example, the device may process the objects and the video data, with a tracking model, to identify positions and classes of the objects and to generate a third feature vector based on the positions and the classes, as described above. In some implementations, the tracking model includes a greedy tracking model that utilizes the positions, the classes, and object detection confidence.

As further shown in FIG. 5, process 500 may include generating a matrix of object features based on the first feature vector, the second feature vector, and the third feature vector (block 550). For example, the device may utilize a second CNN model to generate a matrix of object features based on the first feature vector, the second feature vector, and the third feature vector, as described above. In some implementations, each of the object features of the matrix is a concatenation of the first feature vector, the second feature vector, and the third feature vector.

As further shown in FIG. 5, process 500 may include utilizing a spatiotemporal attention selector model or a max pooled model with the matrix to identify a classification of a maneuver (block 560). For example, the device may utilize a spatiotemporal attention selector model or a max pooled model with the matrix of object features to identify a classification of a maneuver of the vehicle as safe or unsafe, as described above. In some implementations, utilizing the spatiotemporal attention selector model or the max pooled model with the matrix of object features to identify the classification of the maneuver of the vehicle as safe or unsafe includes utilizing the spatiotemporal attention selector model or the max pooled model with the matrix of object features to select particular object features, and determining the classification of the maneuver of the vehicle as safe or unsafe based on the particular object features.

In some implementations, utilizing the spatiotemporal attention selector model or the max pooled model with the matrix of object features to identify the classification of the maneuver of the vehicle as safe or unsafe includes utilizing the spatiotemporal attention selector model or the max pooled model with the matrix of object features to select a set of object features, performing fine-tuning of the set of object features to identify particular object features, and determining the classification of the maneuver of the vehicle as safe or unsafe based on the particular object features.

As further shown in FIG. 5, process 500 may include performing one or more actions based on the classification (block 570). For example, the device may perform one or more actions based on the classification, as described above. In some implementations, performing the one or more actions includes scheduling a driver of the vehicle for training based on the classification of the maneuver of the vehicle being unsafe. In some implementations, performing the one or more actions includes determining the classification of the maneuver of the vehicle as unsafe due to one of an improper lane change, an improper turn, a collision, or a loss of vehicle control. In some implementations, performing the one or more actions includes generating an alert for a driver of the vehicle based on the classification of the maneuver of the vehicle being unsafe.

In some implementations, performing the one or more actions includes generating an alert for a fleet manager of the vehicle based on the classification of the maneuver of the vehicle being unsafe. In some implementations, performing the one or more actions includes retraining one or more of the object detector model, the first CNN model, the tracking model, the second CNN model, the spatiotemporal attention selector model, or the max pooled model based on the classification of the maneuver of the vehicle.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
   receiving, by a device, video data that includes a plurality of video frames and corresponding global positioning system (GPS) data and inertial measurement unit (IMU) data associated with a vehicle;
   processing, by the device, the video data, with an object detector model, to identify objects in the video data and to generate a first feature vector based on the objects;
   processing, by the device, the GPS data and the IMU data, with a first convolutional neural network (CNN) model, to generate a second feature vector;
   processing, by the device, the objects and the video data, with a tracking model, to identify positions and classes of the objects and to generate a third feature vector based on the positions and the classes;
   utilizing, by the device, a second CNN model to generate a matrix of object features based on the first feature vector, the second feature vector, and the third feature vector;
   utilizing, by the device, a spatiotemporal attention selector model or a max pooled model with the matrix of object features to identify a classification of a maneuver of the vehicle as safe or unsafe; and
   performing, by the device, one or more actions based on the classification.

2. The method of claim 1, wherein processing the GPS data and the IMU data, with the first CNN model, to generate the second feature vector comprises:
   processing the GPS data and the IMU data, with a first CNN model, to align sampling rates of the GPS data and the IMU data and timestamps of the video data, to extract GPS and IMU features, and to generate the second feature vector based on aligning the sampling rates and the timestamps and based on the GPS and IMU features.

3. The method of claim 1, wherein the object detector model includes a faster region-based convolutional neural network model and a residual neural network model.

4. The method of claim 1, wherein the first CNN model includes two-dimensional depth-wise separable convolutions.

5. The method of claim 1, wherein the tracking model includes a greedy tracking model that utilizes the positions, the classes, and object detection confidence.

6. The method of claim 1, wherein each of the object features of the matrix is a concatenation of the first feature vector, the second feature vector, and the third feature vector.

7. The method of claim 1, wherein utilizing the spatiotemporal attention selector model or the max pooled model with the matrix of object features to identify the classification of the maneuver of the vehicle as safe or unsafe comprises:
   utilizing the spatiotemporal attention selector model or the max pooled model with the matrix of object features to select particular object features; and
   determining the classification of the maneuver of the vehicle as safe or unsafe based on the particular object features.

8. A device, comprising:
   one or more processors configured to:
      receive video data that includes a plurality of video frames and corresponding global positioning system (GPS) data and inertial measurement unit (IMU) data associated with a vehicle;
      process the video data, with an object detector model, to identify objects in the video data and to generate a first feature vector based on the objects,
         wherein the object detector model includes a faster region-based convolutional neural network model and a residual neural network model;
      process the GPS data and the IMU data, with a first convolutional neural network (CNN) model, to generate a second feature vector;
      process the objects and the video data, with a tracking model, to identify positions and classes of the objects and to generate a third feature vector based on the positions and the classes;
      utilize a second CNN model to generate a matrix of object features based on the first feature vector, the second feature vector, and the third feature vector;
      utilize a spatiotemporal attention selector model or a max pooled model with the matrix of object features to identify a classification of a maneuver of the vehicle as safe or unsafe; and
      perform one or more actions based on the classification.

9. The device of claim 8, wherein the one or more processors, to utilize the spatiotemporal attention selector model or the max pooled model with the matrix of object features to identify the classification of the maneuver of the vehicle as safe or unsafe, are configured to:
   utilize the spatiotemporal attention selector model or the max pooled model with the matrix of object features to select a set of object features;
   perform fine-tuning of the set of object features to identify particular object features; and
   determine the classification of the maneuver of the vehicle as safe or unsafe based on the particular object features.

10. The device of claim 8, wherein the one or more processors, to perform the one or more actions, are configured to:
   schedule a driver of the vehicle for training based on the classification of the maneuver of the vehicle being unsafe.

11. The device of claim 8, wherein the one or more processors, to perform the one or more actions, are configured to:
   determine the classification of the maneuver of the vehicle as unsafe due to one of an improper lane change, an improper turn, a collision, or a loss of vehicle control.

12. The device of claim 8, wherein the one or more processors, to perform the one or more actions, are configured to:
   generate an alert for a driver of the vehicle based on the classification of the maneuver of the vehicle being unsafe.

13. The device of claim 8, wherein the one or more processors, to perform the one or more actions, are configured to:
   generate an alert for a fleet manager of the vehicle based on the classification of the maneuver of the vehicle being unsafe.

14. The device of claim 8, wherein the one or more processors, to perform the one or more actions, are configured to:
   retrain one or more of the object detector model, the first CNN model, the tracking model, the second CNN model, the spatiotemporal attention selector model, or the max pooled model based on the classification of the maneuver of the vehicle.

15. A non-transitory computer-readable medium storing a set of instructions, the set of instructions comprising:
   one or more instructions that, when executed by one or more processors of a device, cause the device to:
      receive video data that includes a plurality of video frames and corresponding global positioning system (GPS) data and inertial measurement unit (IMU) data associated with a vehicle;
      process the video data, with an object detector model, to identify objects in the video data and to generate a first feature vector based on the objects;
      process the GPS data and the IMU data, with a first convolutional neural network (CNN) model, to generate a second feature vector,
         wherein the first CNN model includes two-dimensional depth-wise separable convolutions;
      process the objects and the video data, with a tracking model, to identify positions and classes of the objects and to generate a third feature vector based on the positions and the classes;
      utilize a second CNN model to generate a matrix of object features based on the first feature vector, the second feature vector, and the third feature vector;
      utilize a spatiotemporal attention selector model or a max pooled model with the matrix of object features to identify a classification of a maneuver of the vehicle as safe or unsafe; and
      perform one or more actions based on the classification.

16. The non-transitory computer-readable medium of claim 15, wherein the one or more instructions, that cause the device to process the GPS data and the IMU data, with the first CNN model, to generate the second feature vector, cause the device to:
   process the GPS data and the IMU data, with a first CNN model, to align sampling rates of the GPS data and the IMU data and timestamps of the video data, to extract GPS and IMU features, and to generate the second feature vector based on aligning the sampling rates and the timestamps and based on the GPS and IMU features.

17. The non-transitory computer-readable medium of claim 15, wherein the one or more instructions, that cause the device to utilize the spatiotemporal attention selector model or the max pooled model with the matrix of object features to identify the classification of the maneuver of the vehicle as safe or unsafe, cause the device to:

utilize the spatiotemporal attention selector model or the max pooled model with the matrix of object features to select particular object features; and determine the classification of the maneuver of the vehicle as safe or unsafe based on the particular object features.

18. The non-transitory computer-readable medium of claim 15, wherein the one or more instructions, that cause the device to utilize the spatiotemporal attention selector model or the max pooled model with the matrix of object features to identify the classification of the maneuver of the vehicle as safe or unsafe, cause the device to:

utilize the spatiotemporal attention selector model or the max pooled model with the matrix of object features to select a set of object features;

perform fine-tuning of the set of object features to identify particular object features; and determine the classification of the maneuver of the vehicle as safe or unsafe based on the particular object features.

19. The non-transitory computer-readable medium of claim 15, wherein the one or more instructions, that cause the device to perform the one or more actions, cause the device to one or more of:

schedule a driver of the vehicle for training based on the classification of the maneuver of the vehicle being unsafe; or determine the classification of the maneuver of the vehicle as unsafe due to one of an improper lane change, an improper turn, a collision, or a loss of vehicle control.

20. The non-transitory computer-readable medium of claim 15, wherein the one or more instructions, that cause the device to perform the one or more actions, cause the device to one or more of:

generate an alert for a driver of the vehicle based on the classification of the maneuver of the vehicle being unsafe;

generate an alert for a fleet manager of the vehicle based on the classification of the maneuver of the vehicle being unsafe; or retrain one or more of the object detector model, the first CNN model, the tracking model, the second CNN model, the spatiotemporal attention selector model, or the max pooled model based on the classification of the maneuver of the vehicle.

\* \* \* \* \*